United States Patent [19]

Kyoto et al.

[11] Patent Number: 4,979,971
[45] Date of Patent: Dec. 25, 1990

[54] METHOD FOR PRODUCING GLASS PREFORM FOR OPTICAL FIBER

[75] Inventors: Michihisa Kyoto; Minoru Watanabe; Hiroo Kanamori, all of Yokohama, Japan

[73] Assignee: Sumitomo Electric Industries, Ltd., Osaka, Japan

[21] Appl. No.: 472,446

[22] Filed: Jan. 29, 1990

Related U.S. Application Data

[63] Continuation of Ser. No. 106,031, Oct. 8, 1987, abandoned, which is a continuation of Ser. No. 731,904, May 8, 1985, abandoned.

[30] Foreign Application Priority Data

May 15, 1984 [JP] Japan .................. 59-95541

[51] Int. Cl.$^5$ ............................ C08B 37/018
[52] U.S. Cl. ...................... 65/3.12; 65/18.2; 65/900; 65/DIG. 16
[58] Field of Search ............... 65/3.12, 18.2, DIG. 16, 65/2, 17, 900

[56] References Cited

U.S. PATENT DOCUMENTS

| | | | |
|---|---|---|---|
| 3,933,454 | 1/1976 | De Luca | 65/18.2 |
| 4,289,517 | 9/1981 | Bailey | 65/18.2 |
| 4,629,485 | 12/1986 | Berkey | 65/18.2 |

FOREIGN PATENT DOCUMENTS

| | | | |
|---|---|---|---|
| 2428618 | 2/1980 | France | 65/DIG. 16 |
| 55-67533 | 5/1980 | Japan | 65/DIG. 16 |
| 56-50136 | 5/1981 | Japan | 65/DIG. 16 |
| 57-17433 | 1/1982 | Japan . | |
| 57-34034 | 2/1982 | Japan . | |
| 58-58299 | 12/1983 | Japan | 65/900 |

OTHER PUBLICATIONS

Hawley, G. The Condensed Chemical Dictionary; Van Nostrand Reinhold Company, N.Y. 1981, p. 922.
Gmelins Handbruch, Silicium, Part B, System No. 15, 1959, p. 615.

*Primary Examiner*—Kenneth M. Schor
*Attorney, Agent, or Firm*—Cushman, Darby & Cushman

[57] ABSTRACT

A method for producing a glass preform for an optical fiber is disclosed. The method comprises forming a soot preform of glass fine particles comprising SiO$_2$ by flame hydrolysis or solution hydrolysis of a starting glass material and sintering the soot preform in an atmosphere containing at least SiF$_4$ to obtain a glass preform which is free from an increase in absorption due to impurities and has sufficiently low attenuation of light transmission.

4 Claims, 4 Drawing Sheets

METHOD FOR PRODUCING GLASS PREFORM FOR OPTICAL FIBER

This is a continuation of application Ser. No. 07/106,031, filed Oct. 8, 1987, which was abandoned upon the filling thereof, which is a continuation of application Ser. No. 07/731,904, filed May 8, 1985, which was abandoned.

FIELD OF THE INVENTION

The present invention relates to a method for producing a glass preform for use in the fabrication of an optical fiber. More particularly, the invention is concerned with a method for producing a quartz glass preform with fluorine added thereto.

BACKGROUND OF THE INVENTION

A glass preform for use in the fabrication of an optical fiber comprises a core and a cladding surrounding the core. The core must have a higher refractive index than the cladding so as to allow easy propagation of light therethrough.

In order to increase the refractive index of the core higher than that of silica, additives such as $TiO_2$, $GeO_2$ and $Al_2O_3$ are usually added to the core material. In a usual optical fiber, pure quartz glass is often used to form the cladding. In this case, pure quartz glass is produced so that $n=1.4585$ and $\Delta n=0$.

Referring to FIGS. 1A and 1B, there are shown diagrams illustrating distributions of the refractive index of two types of optical fibers. In these figures, the regions A and B indicate the core and cladding, respectively. The difference in refractive index between the core and cladding is usually indicated in terms of a relative refractive index difference (in percent). That is, assuming that the refractive indices of the core and cladding are $n_1$ and $n_2$, respectively, the relative refractive index difference $\Delta n_{12}\%$ is represented by the following equation:

$$\Delta n_{12}\% = \frac{n_1 - n_2}{n_2} \times 100.$$

FIG. 1A shows the general distribution of refractive index of a single mode optical fiber. In this case, $\Delta n_{12}$ is usually 0.3 to 0.5%. FIG. 1B shows the general distribution of refractive index of a multi-mode optical fiber. For an optical fiber for ordinary communication purposes, $\Delta n_{12}$ is usually about 1%, and for large aperture optical fibers used in computer link communication applications, $\Delta n_{12}$ is usually about 2 to 4%.

Oxide additives such as $GeO_2$ added to increase refractive index of the core cause light scattering (Rayleigh scattering) because of their inherent characteristics. As the amount of the additive added is increased, the degree of light scattering (Rayleigh scattering) due to the additive increases. This is not desirable for light transmission.

If the additive is added in a large amount, bubbles and/or a crystal phase are formed in the glass preform. In the case of $GeO_2$, for example, GeO gas easily forms, thereby producing bubbles. In the case of $Al_2O_3$, clusters of $Al_2O_3$ crystals easily forms. This is not desirable for light transmission characteristics and also for the strength of the final optical fiber. Furthermore, the coefficient of thermal expansion of glass increases, which makes the glass preform fragile. Therefore, also from the viewpoints of light propagation and glass strength, it is preferred to reduce the amount of the additive added to the core.

For this reason, it is proposed to increase the refractive index difference between the core and cladding by lowering the refractive index of the cladding. For example, additives which lower the refractive index, such as $B_2O_3$, fluorine or a combination thereof, can be added to the cladding. $B_2O_3$, however, has disadvantages in that the coefficient of thermal expansion of the resulting cladding greatly changes with the concentration of $B_2O_3$ and in that the refractive index changes upon heating. Furthermore, with regards to light transmission characteristics, the cladding has an absorption loss due to $B_2O_3$ in a longer wavelength region. Thus, it is preferred to use fluorine as a refractive index-lowering agent.

It is known that addition of fluorine to quartz glass makes it possible to produce optical fibers with various refractive index distributions, and that, by the proper choice of structure, there can be obtained an optical fiber of low dispersion over a wide wavelength region.

The advantage that can be obtained by using fluorine as an additive is that, since the refractive index of the cladding can be made lower than that of pure quartz, pure quartz or quartz glass with a small amount of additive added thereto can be used in the fabrication of the core.

FIGS. 2A through 2D show typical refractive index distribution structures of which those of FIGS. 2A and 2C are of the step index type and those of FIGS. 2B and 2D are of the graded index type. In all of FIGS. 2A to 2D, fluorine is added to the cladding. With regards to the core, in the case of FIG. 2A, a small amount of an oxide which increase the refractive index, such as $GeO_2$ and $P_2O_5$, is added to quartz glass, whereas in the case of FIG. 2C, highly pure quartz glass containing no additive is used. In FIG. 2B, the amount of fluorine added is decreased continuously from the periphery of the core to the center, and the central portion is made of pure quartz glass not containing fluorine (the refractive index of pure quartz glass in $n=1.4585$, $\Delta n=0$). In FIG. 2D, the amount of fluorine added is decreased continuously from the periphery of the core to the center, and at a certain distance from the periphery, there starts the addition of an additive used to increase the refractive index of quartz glass, with the amount of the additive added increasing continuously toward the center.

As a matter of course, to control the refractive index and facilitate the working of the glass, additives such as $GeO_2$, $P_2O_5$, $B_2O_3$ and $Al_2O_3$ can be used in combination with fluorine in the cladding and core.

In order to obtain the same refractive index difference as shown in FIG. 1 for an optical fiber of quartz glass with fluoride added thereto, it is sufficient to decrease the amount of oxides added to the core, or alternatively, not to add the oxides at all. This leads to reduction in the degree of Rayleigh scattering due to the presence of the additive. Thus, the resulting optical fiber is preferred as a wave guide. Fluorine is available in abundance as compared with additives such as $GeO_2$, and furthermore is advantageous from an economical standpoint in that its purification is easy. Another feature is that a fluorine-containing compound is superior not only as a starting material for the additive, but also as a dehydrating agent for removing water contained in the soot.

Various techniques are known for fabrication of quartz glass optical fibers, including the inside chemical vapor deposition (CVD) method (cf. for example, Japanese Patent Publications Nos. 23186/76 and 22423/80), the outside chemical vapor deposition (CVD) method (cf. for example, Japanese Patent Kokai Publication (unexamined) No. 10055/74), the vapor axial deposition (VAD) methods (cf. for example, Japanese Patent Kokai Publication (unexamined) No. 71316/76), and the plasma chemical vapor deposition (CVD) method (cf. for example, Japanese Patent Kokai Publication (unexamined) No. 54446/76). Of these methods, the outside CVD method utilizing flame hydrolysis and the VAD method are superior in productivity and are economical procedures. On the other hand, although fluorine can be added to quartz glass by a procedure utilizing flame hydrolysis, it is quite difficult to uniformly add a sufficient amount of fluorine to the quartz glass by this procedure.

Japanese Patent Publication No. 15682/80 discloses a method in which fluorine is added to glass by supplying a gaseous fluorine-containing compound in the step of synthesizing glass in a gas phase. This method does permit the addition of fluorine to glass, but has a disadvantage in that the efficiency of deposition of glass and the yield of addition of fluorine (doping yield) are low. The reason for this is considered as follows:

In the flame hydrolysis method using an oxyhydrogen flame, water in the flame reacts with a fluorine-containing compound (e.g., $SF_6$) according to equation (3) below, thereby producing hydrogen fluoride (HF) gas:

$$SF_6 + 3H_2O \rightarrow SO_3 + 6HF \qquad (1)$$

HF gas is stable, and almost all of the fluorine-containing compound is converted into HF gas at elevated temperatures as long as there is water present. Thus, a minor proportion of fluorine-containing compound is utilized as the starting additive material.

HF acts to corrode glass, particularly quartz ($SiO_2$), and easily reacts with fine quartz particles formed in the flame according to the following equations (4) and (5):

$$SiO_2(s) + 2HF(g) \rightarrow SiOF_2(g) + H_2O(g) \qquad (2)$$

$$SiO_2(s) + 4HF(g) \rightarrow SiF_4(g) + 2H_2O(g) \qquad (3)$$

wherein (s) and (g) indicate solid and gas states, respectively. These reactions inhibit the grain growth of glass particles and decrease the amount of fine glass particles being deposited. This is apparent from the fact that, as the amount of a fluorine compound added is increased, the rate of deposition of fine glass particles drops, and finally they do not deposit at all.

Japanese Patent Kokai Publication (unexamined) No. 67533/80 discloses a method which is intended to overcome the above-described problems of the method of Japanese Patent Publication No. 15682/80. Specifically, it discloses: (1) a method for producing a glass material for optical glass particles formed by the flame hydrolysis method in an atmosphere of a fluorine-containing compound at 1,000° C. or less, and thereafter sintering the laminated body by heating it to higher than 1,400° C. in an inert gas atmosphere; and (2) a method for producing a glass material for optical transmission which comprises heating the glass particle laminated body of (1) in a fluorine-containing compound/inert gas atmosphere to higher than 1,400° C. to form a glass material containing fluorine. Methods (1) and (2) enable the addition of fluorine more effectively than the method of Japanese Patent Publication No. 15682/80. It has been revealed, however, that methods (1) and (2) still have disadvantages as described below.

In method (1), the rate of addition of fluorine to glass is low and, in some cases, the ultimate optical fiber contains impurities such as copper and iron, and an increase in attenuation of light transmission due to such impurities reaches about 3 to 5 dB/km at a wavelength of 1.30 micrometer (the usual loss at this wavelength band is 0.3 dB/km). The amount of fluorine added to glass by method (1) is $-0.20\%$ in terms of the refractive index difference $\Delta n_{12}$ (F).

Method (2) is an efficient procedure in that, as compared with method (1), the rate of addition of fluorine is high and the amount of fluorine added is large. After a processing time of 6 hours, $\Delta n_{12}$ (F) reaches $-0.25\%$. However, the obtained glass preform is seriously corroded and has an irregular surface. The core tube used in the production of the glass preform, which is a quartz muffle tube used to hold therein a gas atmosphere, is seriously corroded and, in some cases, perforations are formed in the walls of the tube. This etching is considered to partly accelerate the incorporation of impurities from the muffle tube into the soot preform. The attenuation of light transmission of the thus produced optical fiber is about 10 dB/km at a wavelength of 1.30 micrometer. Since the content of hydroxyl groups in the optical fiber is 0.05 ppm or less, it cannot be considered that the increase in absorption loss at 1.30 micrometer is due to the presence of the hydroxyl groups. There are many experiments supporting the conclusion that the increase in absorption loss due to impurities such as copper and iron existing in the optical fiber amounts to 9.5 dB/km.

In addition, the optical fiber produced by the above-described method has disadvantages in that the absorption loss due to the hydroxyl groups changes with time, and that as the temperature rises, the absorption loss considerably increases.

One of the reasons why impurities such as copper and iron are present in the optical fiber is that corrosion of the core tube allows $Fe_2O_3$ and $CuO$ present in the core tube walls to migrate to the surface of the tube and to intermingle with the soot, undergoing reactions represented by the following equations:

$$Fe_2O_3 + 2F_2 \rightarrow 2FeF_2 + 3/2 O_2 \qquad (4)$$

$$CuO + \tfrac{1}{2}F_2 \rightarrow CuF + 1/2 O_2 \qquad (5)$$

Although $FeF_2$ and $CuF$ are solid up to 1,100° C., they sublimate at temperatures higher than 1,100° C., thereby intermingling with the soot. Thus the soot preform is contaminated with $FeF_2$ and $CuF$.

When $Fe_2O_3$ and $CuO$ are contained in the soot preform, even if they undergo the reactions of equations (4) and (5), the resulting products $FeF_2$ and $CuF$ are not removed from the soot and remain therein as impurities since they are solid at temperatures below 1,100° C. Thus, in accordance with either of methods (1) and (2), impurities are left in the optical fibers.

SUMMARY OF THE INVENTION

The present invention is intended to overcome the above-described problems of the prior arts, and one object of the present invention is to provide a method for efficiently adding fluorine to a glass preform for fabrication of optical fibers.

Another object of the present invention is to provide a method for producing a glass preform for the fabrication of an optical fiber in which the rate of addition of fluorine to fine glass particles is increased, addition of impurities such as copper and iron to glass in the step of adding fluorine is prevented, and the optical fiber fabricated from the glass preform has stable light transmission characteristics.

As a result of the extensive study, it has now been found that, when $SiF_4$ prepared by reacting fine quartz particles and a fluorine-containing compound, or highly pure $SiF_4$ is used for adding fluorine to the glass preform, it does not react with the soot preform or the quartz muffle tube, and, therefore the soot preform is not consumed and the impurity due to etching of the quartz muffle tube is not contained in the glass preform.

The present invention is based on the above findings and provides a method for producing a glass preform, which method comprises forming a soot preform of glass fine particles comprising $SiO_2$ by flame hydrolysis or solution hydrolysis of a starting glass material and sintering the soot preform in an atmosphere containing at least $SiF_4$.

BRIEF DESCRIPTION OF THE DRAWINGS

FIGS. 5A, 5B and 4C show the distribution of refractive indices of the soot preforms as produced in Examples 1(1) to 1(3);

Figures 1A, 1B:
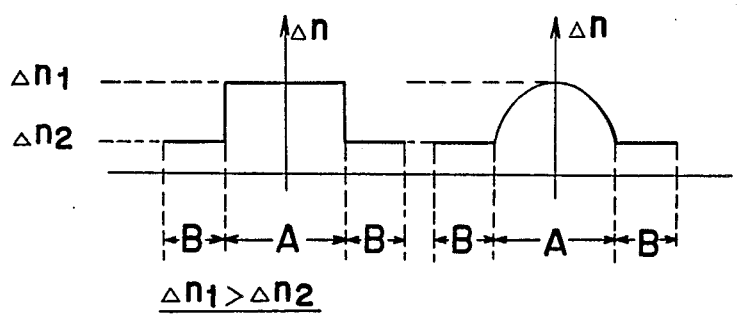
FIG. 1A shows the general refractive index distribution of a single mode optical fiber.
FIG. 1B shows the general refractive index distribution of a multi-mode optical fiber.
Figures 2A, 2B, 2C, 2D:
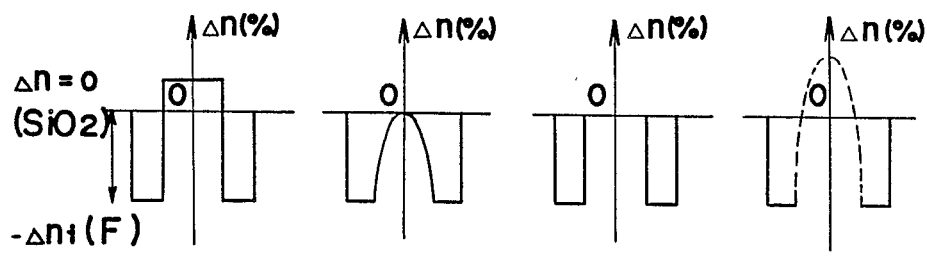
FIGS. 2A to 2D show the refractive index distribution of low-dispersion type optical fibers in which the cladding is added with fluorine.

DETAILED DESCRIPTION OF THE INVENTION $SiF_4$ to be used in the method according to the present invention is prepared by reacting the fine quartz particle and the gaseous fluorine-containing compound which is stable in air.

As the gaseous fluorine-containing compound stable in air, $SF_6$, $CF_4$, $C_2F_6$, $C_3F_8$, $CCl_2F_2$ and $COF_2$ are used.

The fine quartz particles may be produced, for example, by thermally oxidizing $SiCl_4$ according the equation (6):

$$SiCl_4 + O_2 \rightarrow SiO_2 + 2Cl_2 \quad (6)$$

or by hydrolizing $SiCl_4$ in steam according to the equation (7):

$$SiCl_4 + H_2O \rightarrow SiO_2 + 4HCl \quad (7)$$

According to these methods, the fine quartz particles each having a particle size of 0.1 to 0.5 micrometer are produced Specific surface area of the fine quartz particle is preferably increased as large as possible and the particles are preactivated by heating them at a temperature higher 600° C.

Then, the fluorine-containing compound which is stable in air is passed through the fine quartz particles at a room temperature under atmospheric pressure, the following reactions (8) and (9) may proceed:

$$SiO_2 + 2/3 SF_6 \rightarrow SiF_4 + 2/3 SO_2 + 1/6 O_2 \quad (8)$$

$$SiO_2 + CF_4 \rightarrow SiF_4 + CO_2 \quad (9)$$

The thus produced $SiF_4$ is charged in a heating furnace in which the soot preform is sintered to produce a glass preform containing fluorine.

Now, the method of the invention is illustrated by making reference to the accompanying drawings.

Figure 3:
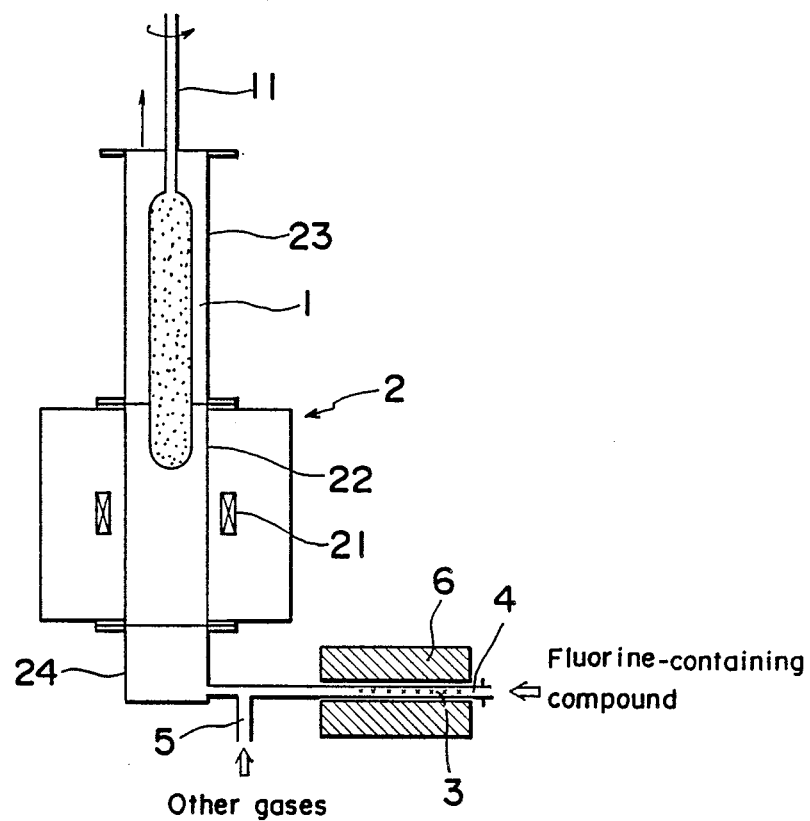
FIG. 3 schematically shows one preferred embodiment of the method according to the present invention.

FIG. 3 schematically shows one preferred embodiment of the method according to the present invention, in which numeral 1 represents a soot preform; numeral 2, an electric furnace; numeral 3, fine quartz particles; numeral 4, an inlet for a fluorine-containing compound; numeral 5, an inlet for other gases; numeral 6, a furnace for decomposing the fluorine-containing compound; numeral 11, a seed rod; numeral 21, a carbon heater; numeral 22, an inner muffle; numeral 23, an upper flange; and numeral 24, a lower flange.

The fine quartz particle 3 is prepared by hydrolysis and have particle sizes from 0.1 to 0.2 micrometer. When as the fluorine-containing compound, for example, $SF_6$ is charged in the decomposing furnace kept at about 900° C., the reaction (8) takes place to produce $SiF_4$. Produced $SiF_4$ is passed through the lower flange 24 to the muffle 22 in the electric furnace 2. In the furnace 2 heated at 1,200° C., the soot preform 1 is sintered with adding fluorine liberated from $SiF_4$. This method is safe since only the inactive fluorine-containing compound is to be treated in air. Alternatively, highly pure $SiF_4$ may be directly introduced in the muffle 22. In this case, since $SiF_4$ reacts with a trace amount of water, for example, moisture in air, at a room temperature, a great care should be taken to avoid moisture. However, when pure $SiF_4$ is directly introduced, any gas such as $SO_2$, $O_2$ and $CO_2$ which are by-produced according to the reactions (8) and (9) is not present and, therefore, the formation of bubbles in the preform is prevented. This is of great advantage particularly when a large amount of $SiF_4$ is introduced in the muffle.

PRODUCTION OF SOOT PREFORM

Figures 4A, 4B:
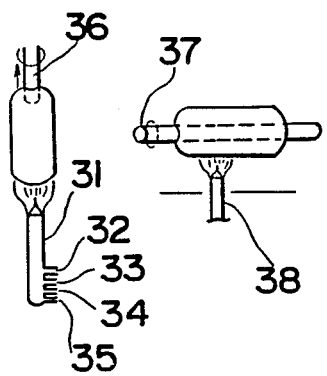
FIGS. 4A and 4B are views illustrating a method for producing a soot preform by the flame hydrolysis method.

In producing a quartz glass fine particle mass by flame hydrolysis, as indicated in FIG. 4A, oxygen 32, hydrogen 33, and a starting material gas 35, namely $SiCl_4$ or a gaseous mixture of $SiCl_4$, $GeCl_4$, $AlCl_3$, $SF_6$, and the like, are introduced into an oxyhydrogen flame with Ar gas or He gas as a carrier gas by means of a coaxial multi-tube burner 31 made of quartz. In FIG. 4A, numeral 34 indicates Ar gas which is introduced as a barrier gas so that the starting material gas reacts in a space several millimeters apart from the top of the burner 31. If it is intended to produce a fine glass particle rod, the fine glass particle mass is deposited in the axial direction from the top of rotating seed member 36. If it is intended to produce a pipe-like fine glass particle mass, as shown in FIG. 4B, a fine glass particle mass is deposited around a rotating quartz bar or carbon bar 37 while horizontally travelling a burner 38 and, thereafter, the bar 37 is removed. The bar 37 may be a glass preform for the core. In this case, the bar need not be removed. A plurality of burners 38 may be used. The conditions for depositing the fine quartz particles on the seed member are substantially the same as in the conventional method.

The same soot preform as produced by the method of FIGS. 4A and 4B can be produced by hydrolysis of alcoholate. This method is called the sol-gel method.

Figures 5A, 5B, 5C:
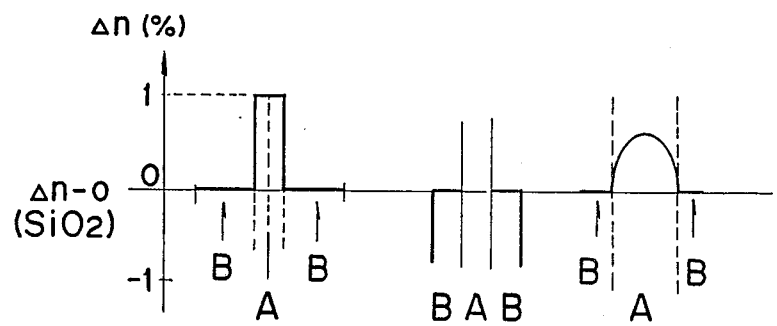

The thus produced soot preform has a refractive index distribution, for example, as shown in FIGS. 5A to 5C, in which the regions A and B represent the core and the cladding, respectively.

SINTERING OF SOOT PREFORM

Figures 6A, 6B, 6C:
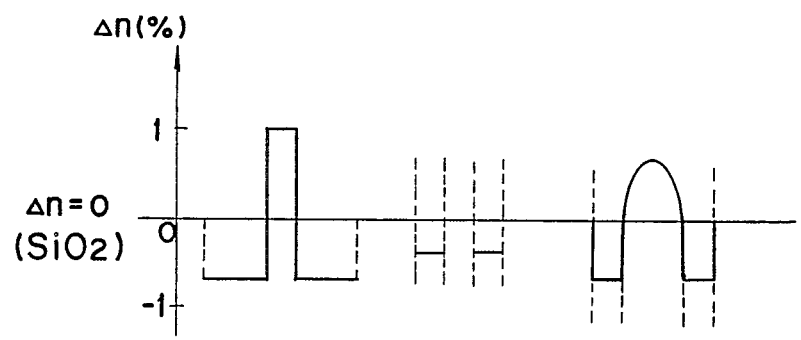
FIGS. 6A to 6C shows the distribution of refractive indices of the glass preform produced from the soot preform as produced in Examples 1(1) to 1(3)

The above produced soot preform is placed in a muffle tube made of pure quartz. It is heated to a temperature from 1,100° to 1,400° C. at a temperature-raising rate of 2° to 10° C./min in an inert gas atmosphere containing $SiF_4$ and optionally a chlorine-containing compound as a dehydrating agent. $SiF_4$ is prepared by decomposing $SF_6$, as shown in FIG. 3, by introducing it in the furnace kept at a temperature from 600° to 1,100° C., for example, about 1,000° C. and containing quartz fine particles with particle size of 0.1 to 0.2 micrometer which has been produced by thermal oxidation. In the inert gas atmosphere, the soot preform is converted into transparent glass in an atmosphere of an inert gas such as He at such a temperature that the surface of the soot is 1,400° C. or higher. The thus-obtained glass preform is a glass material added with fluorine, and its representative refractive index distribution is shown in FIGS. 6A to 6C.

The present invention is described in greater detail with reference to the following Examples.

EXAMPLE 1(1)

Around a seed rod A consisting of a quartz glass rod of 10 mm in diameter added with 17% by weight of $GeO_2$, was deposited a soot B of pure $SiO_2$ by flame hydrolysis to obtain a soot-deposited member with the refractive index distribution as shown in FIG. 5A. This soot-deposited member was converted into transparent glass by raising the temperature from 800° to 1,400° C. at a raising rate of 3° C./min. in a He atmosphere containing 1 mol% of $Cl_2$ and 20 mol% of $SiF_4$ which had been prepared by decomposing $SF_6$. The thus produced glass preform had a refractive index distribution as shown in FIG. 6A.

EXAMPLE 1(2)

In this example, there was used a carbon rod A of about 6 mm in diameter as a seed rod. A carbon powder layer was formed around the surface of the rod by means of an acetylene flame, and then a soot B of pure $SiO_2$ was deposited on the carbon powder layer to obtain a soot-deposited member with the refractive index distribution as shown in FIG. 5B. Thereafter, the carbon rod core was removed from the soot-deposited member, which was then converted into transparent glass by raising the temperature from 800° to 1,400° C. at a raising rate of 3° C./min. in a He atmosphere containing 1 mol% of $Cl_2$ and 10 mol% of $SiF_4$ which had been prepared by decomposing $SF_6$. The thus obtained glass preform had a refractive index distribution as shown in FIG. 6B.

EXAMPLE 1(3)

In this example, as a seed rod, there was used a quartz glass rod A added with $GeO_2$ with varying ratio from 0 to 17% by weight from its center to its surface and having a refractive index distribution as shown in FIG. 5C. A soot B of pure $SiO_2$ was deposited on the rod A by flame hydrolysis. The soot-deposited member was then converted into transparent glass by raising the temperature thereof to 800° to 1,400° C. in a He gas atmosphere containing 1 mol% of $Cl_2$ and 20 mol% of $SiF_4$ which had been prepared by decomposing $SF_6$. The thus-obtained glass preform had a refractive index distribution as shown in FIG. 6C.

CHARACTERISTICS OF THE OPTICAL FIBERS

Optical fibers produced using the glass preforms obtained in Examples 1(1) to 1(3) were free from an increase in absorption due to impurities, and were thus of sufficiently low attenuation of light transmission (for example, about 0.5 dB/km at 1.30 micrometer). Furthermore, the absorption peak due to the hydroxyl group did nor change over time.

The present invention is not limited to the above described Examples and may be modified by using, as the gaseous fluorine-containing compound which is stable in air, $CF_4$, $C_2F_6$, $C_3F_8$, $CCl_2F_2$, $COF_2$, and/or using, as the chlorine-containing hydrating compound, $SOCl_2$, $COCl_2$, $CCl_4$, and the like.

Even if the addition of fluorine and the conversion of the soot preform into transparent glass are performed separately in different furnaces, the amount of fluorine added and the fiber characteristics are substantially the same as in the above Examples.

EXAMPLE 2

Figure 7:
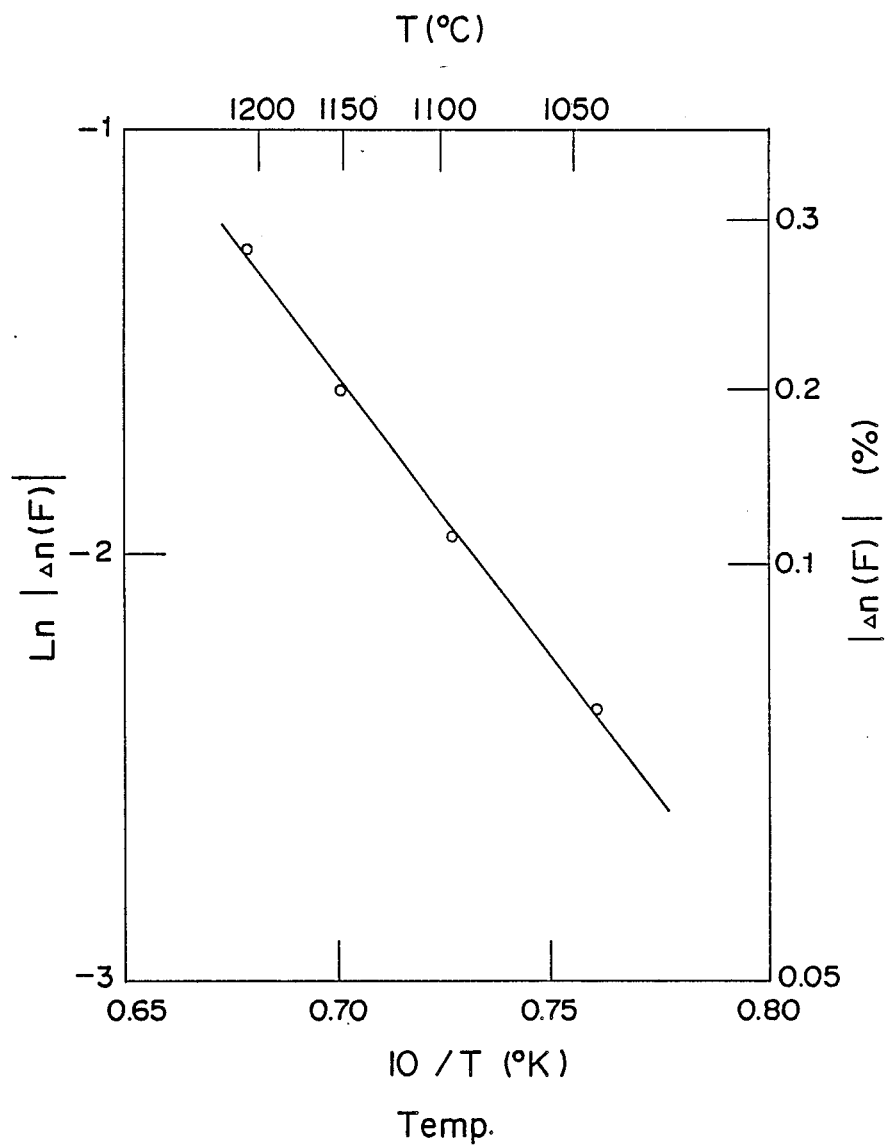
FIG. 7 is a graph showing the relationship between the heat treatment temperature in Example 1 and the refractive index difference ($\Delta n(F)$) of the optical fiber obtained thereby.

Relationship Between Treatment Temperature in Atmosphere Containing Fluorine-Containing Compound and Refractive Index Difference Corresponding to Amount of Fluorine Added:

FIG. 7 is a graph showing the relationship between a treatment temperature and a refractive index difference when the treatment was performed for 3 hours at a predetermined temperature in an inert gas atmosphere containing 1 mol% of chlorine gas and 2 mol% cf $SiF_4$ prepared by decomposing $SF_6$. It can be seen from the results that addition of fluorine to the soot is effective to perform within the range of from 1,100° to 1,400° C.

When $SiF_4$ stored in a cylinder is used, substantially the same results are obtained.

COMPARATIVE EXAMPLE 1

In the same manner as in EXAMPLE 1(1) but using a fluorine-containing compound other than $SiF_4$, for example, pure $SF_6$, the soot preform was sintered to obtain the glass preform. The muffle tube was more severely etched than in case of $SiF_4$ and its lifetime was greatly shortened. In an optical fiber fabricated from the thus produced glass preform, an absorption near a wavelength of 1.1 micrometer appeared, which might be due to the presence of iron or copper. After the optical fiber was heated at 200° C. for 2 hours, the absorption due to the hydroxyl groups increased by 10 times or more.

The glass preform was also etched. This might be caused by $SiF_4$ produced by the direct reaction between the soot preform and the fluorine-containing compound or the presence of impurities produced by the corrosion of the quartz tube with the fluorine-containing compound.

As is apparent from the results in Examples, when fluorine is added in the form of $SiF_4$ produced by reacting the fluorine-containing compound and the quartz particles or pure $SiF_4$ stored in the cylinder, the quartz muffle tube is not etched so that its lifetime is prolonged. In addition, contamination of the soot preform is prevented since iron or copper, which is inevitably included in quartz, is not liberated by etching at a high temperature.

The amount of $SiF_4$ contained in the inert gas atmosphere is preferably not more than 50% by mole. The amount of the chlorine-containing compound optionally contained in the inert gas atmosphere is preferably not more than 2% by mole. When pure $SiF_4$ stored in the cylinder is used, the glass preform not containing any bubble is produced even if $SiF_4$ is added in an amount of about 100% by mole. Thus, pure $SiF_4$ is preferably used when the fluorine is added in a larger amount.

COMPARATIVE EXAMPLE 2

The soot preform produced in the same manner as in Example 1(1) was converted into transparent glass by raising the temperature from 800° to 1,400° C. at a raising rate of 3° C./min. in a He atmosphere containing 5 mol% of $CF_4$. An optical fiber fabricated from the thus produced glass preform had such large attenuation of light transmission as 5 dB/km at a wavelength of 1.30 micrometer due to irregularity of the structure, probably the presence of carbon particles in the optical fiber. The optical fiber had a step type distribution of the refractive index.

EXAMPLE 3

In the same manner as in COMPARATIVE EXAMPLE 2 but using $SiF_4$ prepared by decomposing $CF_4$ in the $SiO_2$ particles in place of $CF_4$, the glass preform was produced. An optical fiber fabricated from the thus produced preform had attenuation of light transmission of 0.5 dB/km at a wavelength of 1.30 micrometer, which is tenth of that of the optical fiber fabricated in COMPARATIVE EXAMPLE 2.

In this case, $CF_4$ added with oxygen may be introduced in the furnace. Since, however, oxygen is added in a larger amount, it may form bubbles in the glass preform.

EXAMPLES 4 to 6

Same soot preforms as produced in EXAMPLES 1(1) to (3) were converted into transparent glass by heating them in a temperature range from 800° to 1,100° C. in an Ar atmosphere containing 1 mol% of $Cl_2$ and then raising the temperature from 1,100° to 1,700° C. in a He atmosphere containing 20% by mole of highly pure $SiF_4$. Optical fibers fabricated from the thus produced glass preforms did not show any increase in absorption due to the presence of impurities and its attenuation of light transmission was less than 0.5 dB/km at a wavelength of 1.30 micrometer. The absorption peak due to the hydroxyl group did not change over time.

EXAMPLE 7

In the same manner as in EXAMPLE 1 but using, as the seed rod A, a quartz glass rod comprising a pure quartz core and a quartz periphery containing 1% by weight of fluorine, a soot preform was produced. The thus produced soot preform was inserted from its one end to the other at a rate of 4 mm/min. into a ZONE furnace kept at 1,200° C. in a He atmosphere containing 2% by mole of $Cl_2$ and then heated it at 1,650° C. in a He atmosphere containing 20% by mole of $SiF_4$ so as to convert the soot preform into a transparent glass preform at a rate of 4 mm/min. from its one end to the other.

An optical fiber fabricated from the thus produced glass preform did not show any increase in absorption due to the presence of impurities and its attenuation of light transmission was sufficiently low, for example, 0.4 dB/km at a wavelength of 1.30 micrometer.

What is claimed is:

1. A method for producing a glass preform for an optical fiber comprising, in the order stated, the steps of:
   (a) producing fine glass particles consisting essentially of $SiO_2$ by flame hydrolysis of a glass-forming raw material,
   (b) depositing the fine glass particles on a seed member to produce a soot-deposited member,
   (c) placing the soot-deposited member in a muffle tube made of pure quartz, and
   (d) heating the soot-deposited member in an inert gas containing a chlorine-containing compound which inert gas containing said compound is passed through the muffle tube to dehydrate the soot-deposited member, and
   (e) sintering the dehydrated soot-deposited member in an atmosphere consisting of helium and $SiF_4$ in an amount sufficient for adding fluorine to the soot which atmosphere is passed through the muffle tube, the sintering being carried out in the absence of the chlorine-containing compound and at a temperature not lower than 1,400° C., the sintering thereby forming a fluorine-added transparent glass preform for an optical fiber.

2. The method according to claim 1, wherein the $SiF_4$ in step (e) is prepared by reacting fine quartz particles each having a particle size of 0.1 to 0.5 micrometer and a fluorine-containing compound which is stable in air.

3. The method according to claim 2, wherein said fluorine-containing compound used is selected from the group consisting of $SF_6$, $CF_4$, $C_2F_6$, $C_3F_8$, $CCl_2F_2$ and $COF_2$.

4. The method according to claim 1, wherein the chlorine-containing compound in step (d) is selected from the group consisting of $Cl_2$, $SOCl_2$, $COCl_2$ and $CCl_4$.

* * * * *